(12) United States Patent
Sengoku et al.

(10) Patent No.: US 7,933,715 B2
(45) Date of Patent: Apr. 26, 2011

(54) NAVIGATION DEVICE AND NAVIGATION SYSTEM

(75) Inventors: Koji Sengoku, Minato-ku (JP); Aiko Sugawara, Minato-ku (JP); Tadafumi Nogawa, Minato-ku (JP); Masayuki Arai, Wako (JP); Yoshitaka Kinoshita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/668,166

(22) PCT Filed: Jul. 3, 2008

(86) PCT No.: PCT/JP2008/001764
§ 371 (c)(1),
(2), (4) Date: Jan. 7, 2010

(87) PCT Pub. No.: WO2009/008136
PCT Pub. Date: Jan. 15, 2009

(65) Prior Publication Data
US 2010/0198500 A1      Aug. 5, 2010

(30) Foreign Application Priority Data
Jul. 10, 2007   (JP) ................................. 2007-181351

(51) Int. Cl.
G01C 21/28 (2006.01)
G01C 21/34 (2006.01)
G01C 21/26 (2006.01)
G08G 1/123 (2006.01)
(52) U.S. Cl. ........ 701/210; 701/201; 701/202; 701/209; 340/995.2; 340/995.21; 340/995.23
(58) Field of Classification Search .................. 701/202, 701/210, 208, 209; 340/995.2, 995.21, 995.22, 340/995.23, 995.19, 995.1
See application file for complete search history.

(56) References Cited

U.S. PATENT DOCUMENTS
6,456,933 B1 * 9/2002 Hessing ........................ 701/209
(Continued)

FOREIGN PATENT DOCUMENTS
DE       2005/052792    * 2/2006
(Continued)

OTHER PUBLICATIONS
International Search Report for Application No. PCT/JP2008/001764, dated Oct. 7, 2008.

Primary Examiner — Thomas G Black
Assistant Examiner — Christine Behncke
(74) Attorney, Agent, or Firm — Nelson Mullins Riley & Scarborough LLP; Anthony A. Laurentano

(57) ABSTRACT

A navigation device and the like capable of harmonizing a navigation route for guiding a mobile body set on the basis of a support route search result by a navigation server and a navigation route for also guiding the mobile body set independently of the navigation route, from a view point of guiding the mobile body smoothly. In the case where the second navigation route $r_2$ is set in the condition where the first navigation route $r_1$ is set, the second navigation route $r_2$ is set and output so as to include a part $dr_1$ of the first navigation route $r_1$ which takes a position departing from the current position $p_t$ of the automobile 2 by a first distance $d_1$. Therefore, even in the case where the second navigation route $r_2$ is set and output at the navigation device 200 during the time when the automobile 2 is traveling according to the first navigation route $r_1$ output at the navigation device 200, it is possible to guide the automobile 2 according to the original first navigation route $r_1$ until the position departing from the current position $p_t$ of the automobile 2 by the first distance $d_1$. Therefore, it becomes possible to guide the automobile 2 smoothly to the destination position $p_2$, without forcing the automobile 2 to perform abrupt behavior change.

5 Claims, 3 Drawing Sheets

U.S. PATENT DOCUMENTS

| | | | |
|---|---|---|---|
| 6,662,105 B1 * | 12/2003 | Tada et al. | 701/209 |
| 6,785,608 B1 * | 8/2004 | Milici et al. | 701/209 |
| 2008/0255756 A1 * | 10/2008 | Friedrichs et al. | 701/201 |

FOREIGN PATENT DOCUMENTS

| | | |
|---|---|---|
| JP | 9-14984 | 1/1997 |
| JP | 10-160499 | 6/1998 |
| JP | 2000-20870 | 1/2000 |
| JP | 2000-123295 | 4/2000 |
| JP | 2002-90159 | 3/2002 |
| JP | 2003-247845 | 9/2003 |
| JP | 2004-77253 | 3/2004 |
| JP | 2004-184107 | 7/2004 |
| JP | 2004-239918 | 8/2004 |

* cited by examiner

NAVIGATION DEVICE AND NAVIGATION SYSTEM

RELATED APPLICATIONS

This application is a 35 U.S.C. 371 national stage filing of International Application No. PCT/JP2008/001764, filed Jul. 3, 2008, which claims priority to Japanese Patent Application No. 2007-181351 filed on Jul. 10, 2007 in Japan. The contents of the aforementioned applications are hereby incorporated by reference.

BACKGROUND OF THE INVENTION

1. Technical Field

The present invention relates to a navigation device and the like which guides a mobile body on the basis of communication with a navigation server.

2. Description of the Related Art

Conventionally, there has been proposed a technique of receiving a departure position and a destination position of a mobile body from a vehicular navigation device, searching for a route (guide route) from the departure position to the destination position, and transmitting information concerning the route as a search result to the navigation device after partitioning the same (refer to Japanese patent application Laid-open No. 2004-184107).

However, in the case where a route is set by the navigation device, and thereafter a route is set by the navigation device on the basis of the route search result by the navigation server, there is a possibility that the two routes lack harmonization from a view point of guiding the mobile body smoothly.

SUMMARY OF THE INVENTION

In view of the above circumstances, an object to be solved by the present invention is to provide a navigation device and the like capable of harmonizing a navigation route for guiding a mobile body set on the basis of a route search result by a navigation server and a navigation route for also guiding the mobile body set independently of the navigation route, from a view point of guiding the mobile body smoothly.

According to a first aspect of the present invention, there is provided a navigation device which guides a mobile body on the basis of communication with a navigation server, comprising: a first processing unit which recognizes a departure position and a destination position of the mobile body, and which sets and outputs a first navigation route for guiding the mobile body to the destination position; and a second processing unit which makes the navigation server recognize the departure position and the destination position of the mobile body on the basis of communication with the navigation server, which recognizes individual link constituting a support route set by the navigation server for guiding the mobile body to the destination position, and which sets and outputs a second navigation route for guiding the mobile body to the destination position on the basis of individual links; wherein the second processing unit sets and outputs the second navigation route including a part of the first navigation route taking a position departing from the current position of the mobile body by a first distance as a terminal point, in a condition where the first navigation route is set by the first processing unit.

According to the navigation device of the first aspect of the invention, the second navigation route is set and output so as to include a part of the first navigation route which takes the position departing from the current position of the mobile body by the first distance as the terminal point, in the case where the second navigation route is set in the condition where the first navigation route is set. Therefore, even in the case where the second navigation route is set and output at the navigation device during the time when the mobile body is traveling according to the first navigation route output at the navigation device, it is possible to guide the mobile body according to the original first navigation route until the position departing from the current position of the mobile body by the first distance. That is, it is possible to avoid the situation where the second navigation route is set during the time when the mobile body is traveling along the first navigation route, and the mobile body immediately reaches the terminal point of the part of the first navigation route and forced to perform behavior change for transition to the second navigation route. Therefore, it becomes possible to guide the mobile body smoothly to the destination position, without forcing the mobile body to perform abrupt behavior change. That is, from the view point of guiding the mobile body smoothly, it becomes possible to harmonize the second navigation route which is set on the basis of the route search result by the navigation server, and the first navigation route which is set independently of the second navigation route.

The navigation device of a second aspect of the invention is the navigation device of the first aspect of the invention, wherein the first processing unit determines whether or not the mobile body is traveling before the second processing unit sets the second navigation route, and sets the first navigation route on condition that it is determined that the mobile body is traveling.

According to the navigation device of the second aspect of the invention, the first navigation route is set as a provisional guide route, in the situation where the mobile body is traveling and there is a high necessity of guiding the mobile body promptly, and at the same time the second navigation route is not set from lack of link identifiers or the like. Then, after the mobile body is provisionally guided by the first navigation route, it becomes possible to smoothly transit the mobile body from the first navigation route to the second navigation route, and guide the same to the destination position by the second navigation route, without forcing the mobile body to perform abrupt behavior change.

The navigation device of a third aspect of the invention is the navigation device of the first aspect of the invention, wherein the first processing unit sets the first navigation route on the basis of a navigation map information stored in a navigation map storing unit, in place of a link in the range within the first distance from the current position of the mobile body among the links constituting the support route recognized by the second processing unit.

According to the navigation device of the third aspect of the invention, although provisional, the first navigation route is set promptly and surely, taking the map information which is already existing in the navigation device as the basis, and not the link having the possibility of being excessive or deficient for setting the first navigation route for guiding the mobile body.

The navigation device of a fourth aspect of the invention is the navigation device of the first aspect of the invention, wherein the first processing unit recognizes a type of a road on which the mobile body is traveling, and sets the first distance on the basis of the type of the road.

According to the navigation device of the fourth aspect of the invention, the first distance is set variably according to the type of the road, in view of the assumption that the average traveling circumstances of the mobile body varies according to the type of the road. Therefore, from the view point of guiding the mobile body smoothly, it becomes possible to harmonize the second navigation route which is set on the basis of the route search result by the navigation server, and the first navigation route which is set independently of the second navigation route, while taking into account such assumption.

The navigation device of a fifth aspect of the invention is the navigation device of the first aspect of the invention, wherein the second processing unit sets or outputs the second navigation route taking a position departing from the destination position of the mobile body by a second distance as the terminal point.

According to the navigation device of the fifth aspect of the invention, guiding of the mobile body by the second navigation route within the range shorter than the second distance from the destination position is omitted, in view of the fact that there are cases where it is more convenient for the mobile body to travel arbitrarily than to guide the same, in the region surrounding the destination position.

A navigation server of a sixth aspect of the invention is a navigation server which supports guiding of a mobile body by a navigation device, on the basis of communication with the navigation device, comprising: a first support processing unit which recognizes a current position and a destination position of the mobile body on the basis of communication with the navigation device, and which sets a support route for guiding the mobile body from the current position to the destination position; and a second support processing unit which makes the navigation device recognize individual link constituting the support route set by the first support processing unit, on the basis of communication with the navigation device.

According to the navigation server of the sixth aspect of the invention, it becomes possible to harmonize the second navigation route which is set by the navigation device on the basis of the route search result by the navigation server, and the first navigation route which is set by the navigation device independently of the second navigation route, from the view point of guiding the mobile body smoothly.

The navigation server according to a seventh aspect of the invention is the navigation server of the sixth aspect of the invention, wherein the second support processing unit makes the navigation device preferentially recognize a link close to the current position of the mobile body, among the links constituting the support route.

According to the navigation server of the seventh aspect of the invention, it becomes possible to make the navigation device predict the second navigation route on the basis of the link identifier close to the current position of the mobile body. Therefore, it becomes possible to avoid the situation where the second navigation route which guides the mobile body to the destination position and the first navigation route which provisionally guides the mobile body diverges significantly. Further, it becomes possible to avoid the situation where the mobile body is forced to perform abrupt behavior change in order to transit from the first navigation route to the second navigation route.

A navigation system of an eighth aspect of the invention is configured from the navigation device according to the first aspect of the invention and the navigation server according to the sixth aspect of the invention.

According to the navigation system of the eighth aspect of the invention, it becomes possible to harmonize the second navigation route which is set by the navigation device on the basis of the search result of the support route by the navigation server, and the first navigation route which is set by the navigation device independently of the second navigation route, from the view point of guiding the mobile body smoothly.

DETAILED DESCRIPTION OF THE PREFERRED EMBODIMENTS

An embodiment of a navigation system and the like according to the present invention will now be explained below with reference to the accompanying drawings.

Figure 1:
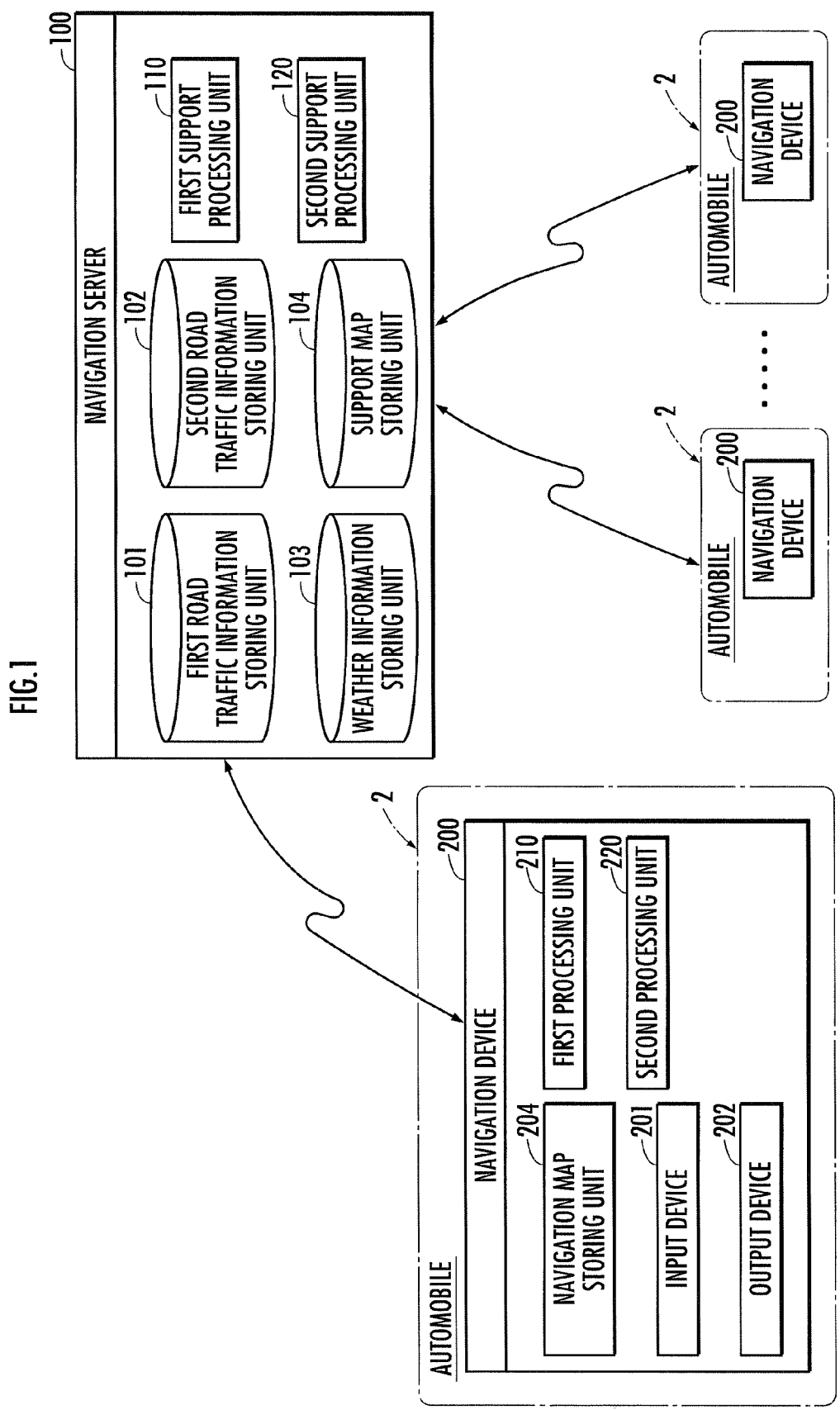
FIG. 1 is a view explaining the configuration of a navigation system according to the present invention.

The configuration of the navigation system of the present invention will be described below. The navigation system shown in FIG. 1 is configured from a navigation server 100, and a navigation device 200 mounted on an automobile 2. It should be noted that the navigation device 200 may be mounted in a mobile device other than an automobile. It is also acceptable for the navigation device 200 to be carried by a user.

The navigation server 100 is configured from one or a plurality of server computers. The navigation server 100 is equipped with a first road traffic information storing unit 101, a second road traffic information storing unit 102, a weather condition storing unit 103, a support map storing unit 104, a first support processing unit 110, and a second support processing unit 120.

The first road traffic information storing unit 101 is stored with a first road traffic information (required moving time, existence or not of a traffic jam and the like in individual link) based on a probe information (position of respective probe car at each time) transmitted or uploaded from the navigation device 200 mounted on the automobile 2 as a probe car or a floating car to the navigation server 100.

A second road traffic information storing unit 102 is stored with a second road traffic information (required moving time, existence or nonexistence of a traffic jam and the like in individual link, and also information representing existence or nonexistence of traffic regulations in individual link, and information representing the existence or nonexistence of an event in the vicinity of individual link and the type of the event, or the like) transmitted from a road traffic information center server and the like to the navigation server 100.

A weather information storing unit 103 is stored with a weather information and the like in the vicinity of individual link transmitted from a weather information center server and the like to the navigation server 100.

The support map storing unit 104 is stored with a support map information. In the support map information, the location, shape and posture or the like of an individual link constituting a road are expressed by a series of coordinates ((latitude, longitude), or (latitude, longitude, altitude)). Moreover, individual link is tagged with link identifier for identifying individual link, and data representing the road type.

The first support processing unit 110 recognizes a departure position $p_1$ and a destination position $p_2$ of the automobile 2 (or a user) on which the navigation device 200 is mounted, on the basis of communication with the navigation device 200. On the basis of the first road traffic information stored in the first road traffic information storing unit 101, the second road traffic information stored in the second road traffic information storing unit 102, the weather information and the like stored in the weather condition storing unit 103, and the support map information stored in the support map storing unit 104, the first support processing unit 110 sets a support route R which connects the departure position $p_1$ and the destination position $p_2$.

The second support processing unit 120 makes the navigation device 200 recognize information concerning individual links constituting the support route R set by the first support processing unit 110 as the link identifiers, on the basis of communication with the navigation device 200.

The navigation device 200 is comprised of an ECU or a computer mounted in the automobile 2 as hardware, and a navigation program which is stored in a memory and which provides the computer with various functions as software. The navigation program may be pre-installed in the memory (ROM) in the vehicular computer, or a part of or all of the navigation program may be downloaded or broadcasted from a server (not shown) via a network or a satellite to the vehicular computer to be stored in the memory (EEPROM, RAM) or the like thereof at an arbitrary timing when there is a request or the like from the vehicular computer.

The navigation device 200 is equipped with an input device 201, an output device 202, a navigation map storing unit 204, a first processing unit 210, and a second processing unit 220.

The input device 201 is comprised of operating buttons or a microphone disposed in a center console or the like of the automobile 2, and enables a user to perform various settings by operation or voice output. The output device 202 is a display device disposed in the center console of the automobile 2 for displaying or outputting map information and the like. The navigation map storing unit 204 is stored with the navigation map information or the like to be output to the output device 202. In the navigation map information, the location, shape and posture or the like of an individual link constituting a road are expressed by a series of coordinates. Moreover, individual link is tagged with the link identifier for identifying individual link. Even though the definitions of the coordinates and the like in the navigation map information and the support map information are different due to the different specifications and data architectures therebetween, it is possible to match the links by tagging the identical links with common link identifier.

The first processing unit 210 sets a first navigation route $r_1$ for guiding the automobile 2 from the departure position $p_1$ to the destination position $p_2$, on the basis of the navigation map information stored in the navigation map storing unit 204. Further, a first processing unit 210 makes the output device 202 disposed in the center console or the like output the first navigation route $r_1$. The second processing unit 220 recognizes the link identifiers of individual links constituting the support route R set by the navigation server 100, on the basis of communication with the navigation server 100. The destination position $p_2$ is input to the navigation device 200 with the operation of the input device 201 by the user. Further, the second processing unit 220 sets a second navigation route $r_2$ for guiding the automobile 2 from the departure position $p_1$ or the current position $p_t$ to the destination position $p_2$, on the basis of the link identifiers. Still further, the second processing unit 220 sets the second navigation route $r_2$ including a part of the first navigation route $r_1$ which takes the position departing from the current position $p_t$ of the automobile 2 by a first distance $d_1$ as the terminal point, in the situation where the first navigation route $r_1$ is set by the first processing unit 210. Moreover, the second processing unit 220 makes the output device 202 output the second navigation route $r_2$.

The function of the navigation system with the above-mentioned configuration will be explained below.

Figure 2:
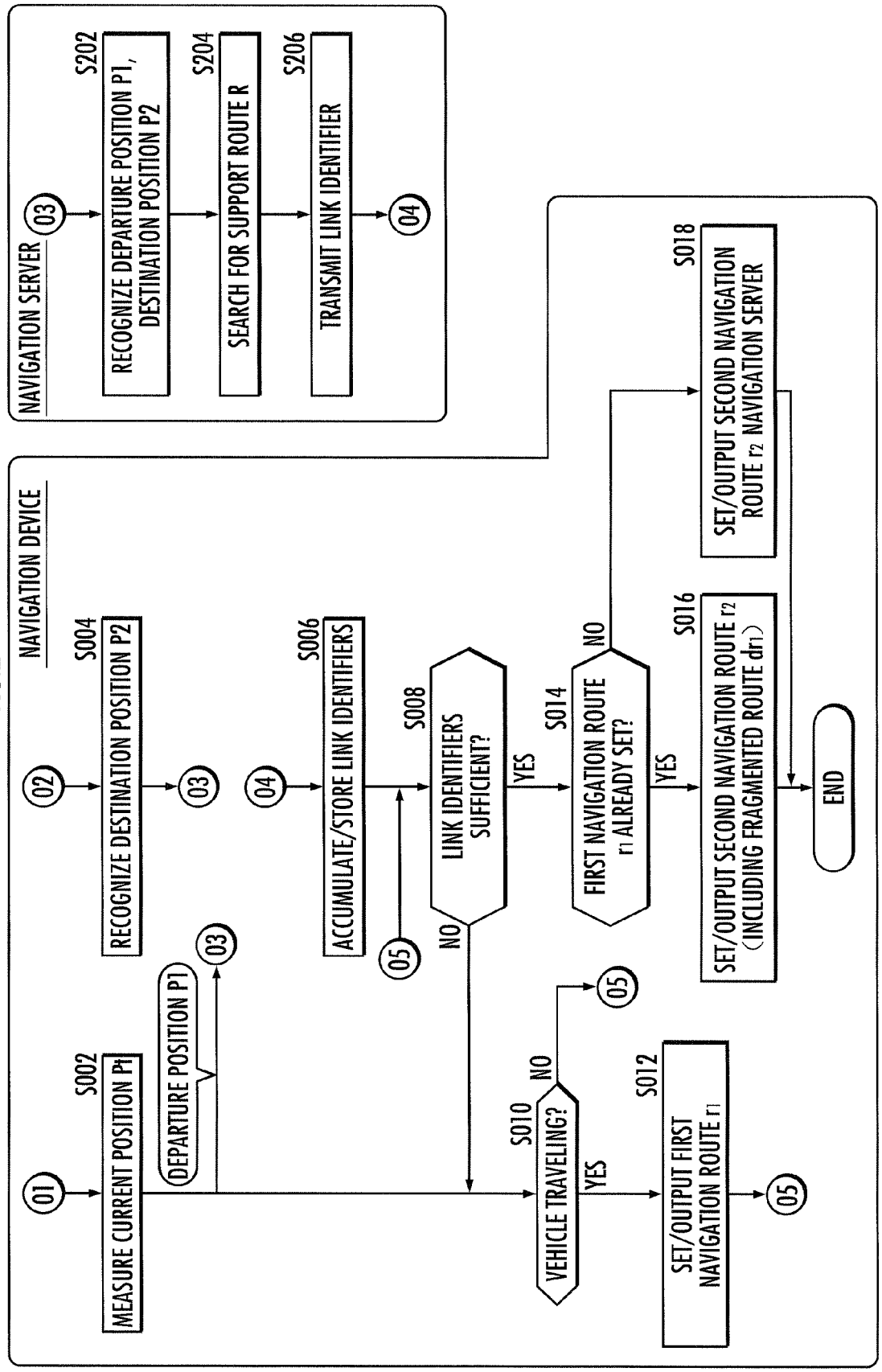
FIG. 2 is a view explaining the function of the navigation system according to the present invention.

In the navigation device 200, the second processing unit 220 measures the current position $p_t$ of the automobile 2 at regular intervals, on the basis of a GPS signal received by a communication device, or outputs from an acceleration sensor and a rate sensor or the like mounted on the automobile 2 (FIG. 2/S002). Further, the destination position $p_2$ of the automobile 2 is input by the user via the input device 201, and the same is recognized by the second processing unit 220 (FIG. 2/S004). The first processing unit 210 transmits or uploads the destination position $p_2$ of the automobile 2 and the departure position $p_1$ (which is equal to the current position $p_t$ of the automobile 2 at the time of input of the destination position $p_2$) to the navigation server 100 together with a navigation identifier for identifying the navigation device 200.

Figure 3:
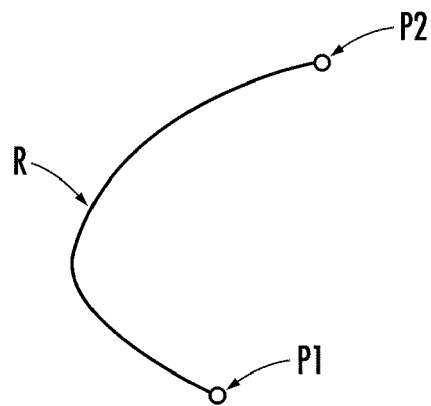
FIG. 3 is a view explaining a setting method of a route by the navigation device of the present invention.
Figure 3:
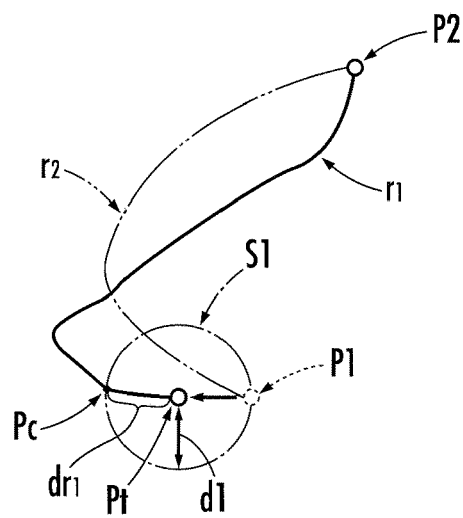
Figure 3:
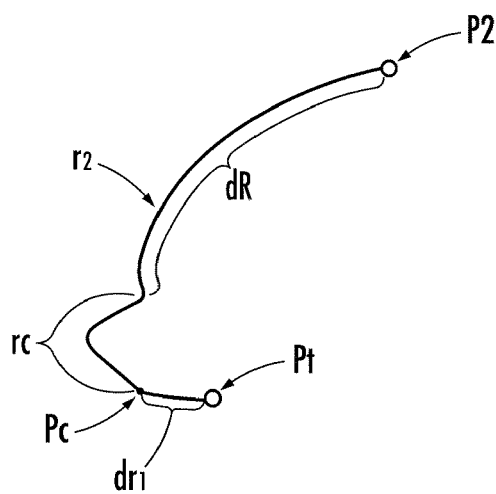

In the navigation server 100, the first support processing unit 110 recognizes the departure position $p_1$ and the destination position $p_2$ associated with the navigation identifier (FIG. 2/S202). Further, the second support processing unit 120 searches for or sets the support route R for guiding the automobile 2 from the departure position $p_1$ to the destination position $p_2$, on the basis of the first road traffic information stored in the first road traffic information storing unit 101, the second road traffic information stored in the second road traffic information storing unit 102, the weather information and the like stored in the weather condition storing unit 103, and the support map information stored in the support map storing unit 104 (FIG. 2/S204). By doing so, the support route R from the current position $p_1$ to the destination position $p_2$ is searched for as is shown in FIG. 3(a). The support route R is set under the condition such as having the shortest moving distance or the predicted required time until the destination position $p_2$, or having the best fuel consumption of the automobile 2 in traveling to the destination position $p_2$.

Then, the second support processing unit 120 successively transmits the link identifiers of individual links constituting the support route R, to the navigation device 200 identified by the navigation identifier (FIG. 2/S206).

In the navigation device 200, the second processing unit 220 successively accumulates or stores the link identifiers in the memory device (not shown) (FIG. 2/S006), and determines whether or not the accumulated link identifiers are satisfactory from the view point of setting the second navigation route $r_2$ (FIG. 2/S008). That is, it is determined whether or not the receipt of the link identifiers transmitted from the navigation server 100 by the second processing unit 220 is completed. When it is determined that the accumulated link identifiers are not satisfactory (FIG. 2/S008 . . . NO), the first processing unit 210 determines whether or not the automobile 2 is traveling (FIG. 2/S010). Whether or not the automobile 2 is traveling is determined on the basis of the existence or not of the change in the current position $p_t$ of the automobile 2 or the output of the velocity sensor thereof, for example.

When it is determined that the automobile 2 is traveling (FIG. 2/S010 . . . YES), the first processing unit 210 sets the first navigation route $r_1$ for guiding the automobile 2 to the destination position $p_2$ on the basis of the navigation map information stored in the navigation map storing unit 204, and the first navigation route $r_1$ is output to the output device 202 (FIG. 2/S012). By doing so, the first navigation route $r_1$ which connects the departure position $p_1$ and the destination position $p_2$ of the automobile 2 is set, as shown in FIG. 3(b). Upon setting the first navigation route $r_1$, the link identifiers of the links included in a range $S_1$ with a radius $d_1$ taking the current position $p_t$ (or the departure position $p_1$) of automobile 2 as reference are not used, and are appropriately deleted from the view point of effectively utilizing the capacity of the memory device. Here, by using the destination position $p_2$, the first navigation route $r_1$ may be set so as to bring the same close to the second navigation route $r_2$ which is estimated to be set in order to guide the automobile 2 to the destination position $p_2$. Further, by using a part of or all of the link identifiers accumulated by the time the first navigation route $r_1$ is set, the first navigation route $r_1$ may be set so as to bring the same close to the second navigation route $r_2$ which is estimated to be set from the link identifiers.

When it is determined that the automobile 2 is not traveling (is static) (FIG. 2/S010 . . . NO), it is determined whether or not the accumulated link identifiers are sufficient (FIG. 2/S008). When it is determined that the accumulated link identifiers are sufficient (FIG. 2/S008 . . . YES), then the second processing unit 220 determines whether or not the first navigation route $r_1$ is already set by the first processing unit 210 (FIG. 2/S014).

When it is determined that the first navigation route $r_1$ is already set (FIG. 2/S014 . . . YES), the second navigation route $r_2$ is set so as to include a fragmented route $dr_1$ of the first navigation route $r_1$ which takes the position departing from the current position $p_t$ of the automobile 2 by the first distance $d_1$ as the terminal point, as is shown in FIG. 3(c) (FIG. 2/S016). For example, when the terminal point of the fragmented route $dr_1$ is not included in the support route R, a second navigation route $r_2$ which connects in series the fragmented route $dr_1$, a connecting route $r_c$ which connects from the terminal point of the fragmented route $dr_1$ to a support route R at the shortest distance, and a fragmented route dR of the support route R which extends from the terminal point of the connecting route $r_c$ to the destination position $p_2$ is set (refer to FIG. 3(c)). Further, when the terminal point of the fragmented route $dr_1$ is not included in the support route R, the second navigation route $r_2$ which connects in series the fragmented route $dr_1$, and a fragmented route dR of the support route R which extends from the terminal point of the fragmented route $dr_1$ to the destination position $p_2$ is set.

On the other hand, when it is determined that the first navigation route $r_1$ is not set (FIG. 2/S014 . . . NO), the second navigation route (two-dot-and-dash line) $r_2$ taking the departure position $p_1$ of the automobile 2 as the starting point is set as is shown in FIG. 3(b), because this determination is based on the determination that the automobile 2 is static (FIG. 2/S018).

According to the navigation system exerting the above-identified functions, the first navigation route $r_1$ is set as a provisional guide route, in the situation where the automobile 2 is traveling and there is a high necessity of guiding the automobile 2 promptly, and at the same time the second navigation route $r_2$ is not set from lack of link identifiers or the like (refer to FIG. 2/S012, FIG. 3(b)). Although provisional, the first navigation route $r_1$ is set promptly and surely, by taking the navigation map information stored in the navigation map storing unit 204 which is already existing in the navigation device 200 as the basis, and not the link identifiers having the possibility of being excessive or deficient for setting the first navigation route $r_1$ for guiding the automobile 2.

Further, when the second navigation route $r_2$ is set in the situation where the first navigation route $r_1$ is set, the second navigation route $r_2$ is set and output so as to include a part $dr_1$ of the first navigation route $r_1$ taking the position departing from the current position $p_t$ of the automobile 2 by the first distance $d_1$ as the terminal point (refer to FIG. 2/S014, FIG. 3(c)). Therefore, even in the case where the second navigation route $r_2$ is set and output at the navigation device 200 during the time when the automobile 2 is traveling according to the first navigation route $r_1$ output at the navigation device 200, the automobile 2 is capable of being guided according to the original first navigation route $r_1$ until the position departing from the current position $p_t$ of the automobile 2 by the first distance $d_1$. That is, it is possible to avoid the situation where the second navigation route $r_2$ is set during the time when the automobile 2 is traveling along the first navigation route $r_1$, and the automobile 2 immediately reaches the terminal point $p_c$ of the fragmented route $dr_1$ of the first navigation route $r_1$ and forced to perform behavior change for transition to the second navigation route $r_2$. Therefore, it becomes possible to guide the automobile 2 smoothly to the destination position $p_2$, without forcing the automobile 2 to perform abrupt behavior change. That is, from the view point of guiding the automobile 2 smoothly, it becomes possible to harmonize the second navigation route $r_2$ which is set on the basis of the search result of the support route R by the navigation server 100, and the first navigation route $r_1$ which is set independently of the second navigation route $r_2$.

Here, the first processing unit 210 may recognize the type of the road on which the automobile 2 is traveling, and set the first distance $d_1$ on the basis of the type of the road. In view of the assumption that the average traveling circumstances of the automobile 2 varies according to the type of the road, the first distance $d_1$ is set variably. Therefore, from the view point of guiding the automobile 2 smoothly, it becomes possible to harmonize the second navigation route $r_2$ which is set on the basis of the search result of the support route R by the navigation server 100, and the first navigation route $r_1$ which is set independently of the second navigation route $r_2$, while taking into account such assumption.

Further, the second processing unit 220 may set or output the second navigation route $r_2$ taking the position departing from the destination position $p_2$ of the automobile 2 by a second distance $d_2$ as the terminal point. Guiding of the automobile 2 by the second navigation route $r_2$ within the range shorter than the second distance $d_2$ from the destination position $p_2$ is omitted, in view of the fact that there are cases where it is more convenient for the automobile 2 to travel arbitrarily than to guide the automobile 2 in the region surrounding the destination position $p_2$.

Further, the second support processing unit 120 may preferentially transmit to the navigation device 200 or make the navigation device 200 recognize the link identifiers of the links close to the current position $p_1$ of the automobile 2 among the links constituting the support route R. Thereby, it is possible to make the navigation device 200 predict the second navigation route $r_2$ on the basis of the link identifiers close to the current position $p_1$ of the automobile 2. Therefore, it becomes possible to avoid the situation where the second navigation route $r_2$ which guides the automobile 2 to the destination position $p_2$ and the first navigation route $r_1$ which provisionally guides the automobile 2 diverges significantly. Further, it becomes possible to avoid the situation where the automobile 2 is forced to perform abrupt behavior change in order to transit from the first navigation route $r_1$ to the second navigation route $r_2$.

The invention claimed is:
1. A navigation device which guides a mobile body on the basis of communication with a navigation server, comprising:
a first processing unit which recognizes a departure position and a destination position of the mobile body, and which sets and outputs a first navigation route for guiding the mobile body to the destination position; and a second processing unit which makes the navigation server recognize the departure position and the destination position of the mobile body on the basis of communication with the navigation server, which recognizes individual link constituting a support route set by the navigation server for guiding the mobile body to the destination position, and which sets and outputs a second navigation route for guiding the mobile body to the destination position on the basis of individual link;

wherein the second processing unit sets and outputs the second navigation route including a part of the first navigation route taking a position departing from the current position of the mobile body by a first distance as a terminal point, in a condition where the first navigation route is set by the first processing unit, and wherein the first processing unit determines whether or not the mobile body is traveling before the second processing unit sets the second navigation route, and sets the first navigation route on condition that it is determined that the mobile body is traveling.

2. The navigation device according to claim 1, wherein the first processing unit sets the first navigation route on the basis of a navigation map information stored in a navigation map storing unit, in place of a link in the range within the first distance from the current position of the mobile body among the links constituting the support route recognized by the second processing unit.

3. The navigation device according to claim 1, wherein the first processing unit recognizes a type of a road on which the mobile body is traveling, and sets the first distance on the basis of the type of the road.

4. The navigation device according to claim 1, wherein the second processing unit sets or outputs the second navigation route taking a position departing from the destination position of the mobile body by a second distance as the terminal point.

5. A navigation system configured from a navigation device which guides a mobile body and a navigation server which supports guiding of the mobile body by the navigation device, on the basis of communication with the navigation device, the navigation device comprising:
a first processing unit which recognizes a departure position and a destination position of the mobile body, and which sets and outputs a first navigation route for guiding the mobile body to the destination position; and a second processing unit which makes the navigation server recognize the departure position and the destination position of the mobile body on the basis of communication with the navigation server, which recognizes individual link constituting a support route set by the navigation server for guiding the mobile body to the destination position, and which sets and outputs a second navigation route for guiding the mobile body to the destination position on the basis of individual link;

wherein the second processing unit sets and outputs the second navigation route including a part of the first navigation route taking a position departing from the current position of the mobile body by a first distance as a terminal point, in a condition where the first navigation route is set by the first processing unit, and wherein the first processing unit determines whether or not the mobile body is traveling before the second processing unit sets the second navigation route, and sets the first navigation route on condition that it is determined that the mobile body is traveling;

the navigation server comprising:
a first support processing unit which recognizes the current position and the destination position of the mobile body on the basis of communication with the navigation device, and which sets a support route for guiding the mobile body from the current position to the destination position; and a second support processing unit which makes the navigation device recognize individual link constituting the support route set by the first support processing unit, on the basis of communication with the navigation device.

* * * * *